United States Patent
Hsiung

(10) Patent No.: US 8,723,737 B2
(45) Date of Patent: May 13, 2014

(54) COVER ASSMEBLY AND ELECTRONIC DEVICE USING THE SAME

(75) Inventor: Ming-Chun Hsiung, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 598 days.

(21) Appl. No.: 13/043,640

(22) Filed: Mar. 9, 2011

(65) Prior Publication Data
US 2012/0139798 A1   Jun. 7, 2012

(30) Foreign Application Priority Data
Dec. 1, 2010   (CN) .......................... 2010 1 0568588

(51) Int. Cl.
*H01Q 1/24*   (2006.01)
(52) U.S. Cl.
USPC .......................................................... 343/702

(58) Field of Classification Search
USPC ........................................ 343/702; 455/575.7
See application file for complete search history.

(56) References Cited

U.S. PATENT DOCUMENTS 7,333,062 B2 *   2/2008   Leizerovich et al. ......... 343/702
2008/0074329 A1 *   3/2008   Caballero et al. ............. 343/702

* cited by examiner

*Primary Examiner* — Robert Karacsony
(74) *Attorney, Agent, or Firm* — Novak Druce Connolly Bove + Quigg LLP

(57) ABSTRACT

A cover assembly includes a cover body, an antenna, and a function key. The cover body includes an end wall and a peripheral wall cooperatively defining a receiving slot. The peripheral wall defines an assembly hole. The antenna is received in the receiving slot and fixed to the end wall. The function key includes a latching plate and a press portion positioned on the latching plate. The press portion extends from the assembly hole, and the latching plate is sandwiched between the antenna and the cover body.

10 Claims, 5 Drawing Sheets

COVER ASSMEBLY AND ELECTRONIC DEVICE USING THE SAME

BACKGROUND

1. Technical Field

The present disclosure relates to cover assembly, and particularly, to an electronic device using a cover assembly.

2. Description of Related Art

A typical electronic device includes a housing, an antenna, and a plurality of keys. The antenna is usually assembled to the housing by adhesion or threaded connection. The keys are latched to the housing. However, the antenna and the keys may obtain an inner room of the housing, therefore, the electronic device may have a large volume to receive the antenna and the keys. Furthermore, the antenna is assembled in the housing, it is inconvenient to repair when the antenna is damaged.

Therefore, there is room for improvement within the art.

BRIEF DESCRIPTION OF THE FIGURES

Many aspects of the cover assembly and electronic device using the same can be better understood with reference to the following figures. The components in the figures are not necessarily drawn to scale, the emphasis instead being placed upon clearly illustrating the principles of the cover assembly and electronic device using the same. Moreover, in the drawings like reference numerals designate corresponding parts throughout the several views.

DETAILED DESCRIPTION

Figure 1:
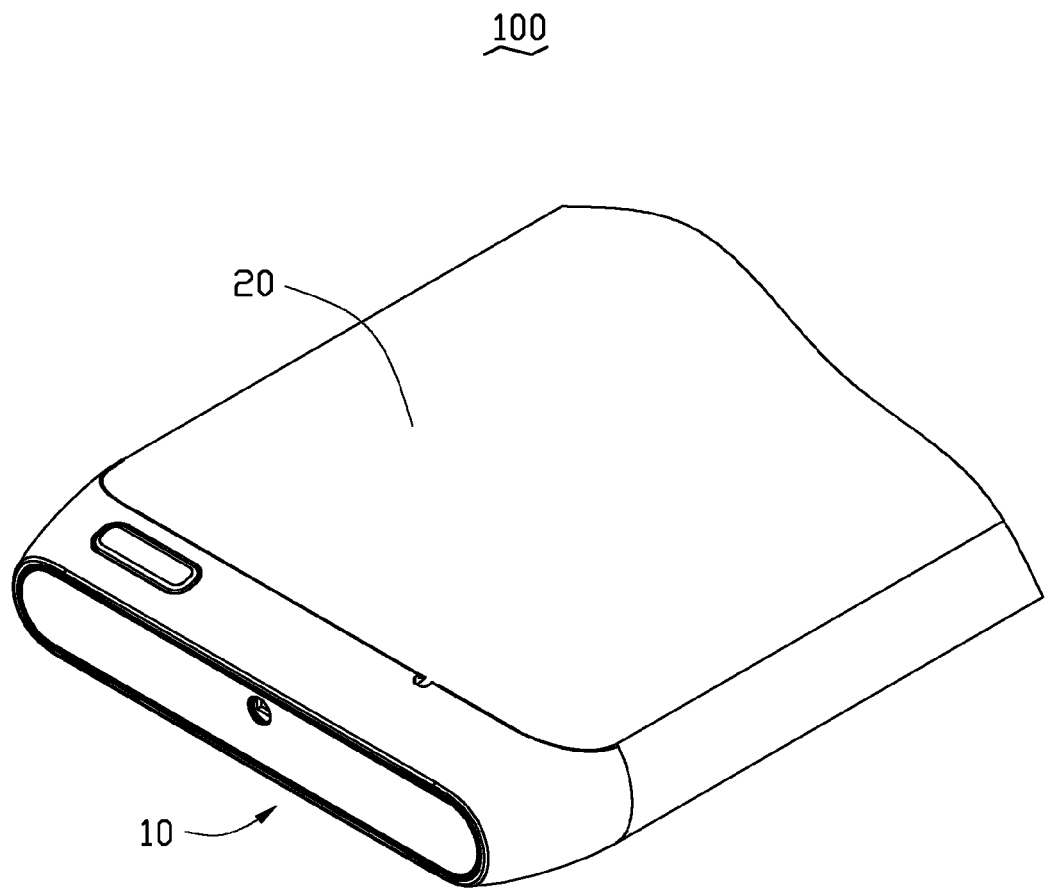
FIG. 1 is an isometric view of an exemplary embodiment of an electronic device.

The present invention discloses a cover assembly used for electronic devices, such as mobile phones and personal digital assistants (PDAs). FIG. 1 shows an exemplary electronic device 100 including a main body 20 and a cover assembly 10. The cover assembly 10 includes a cover body 12, a function key 14, an antenna 16, and a decorative sheet 18. The function key 14 and the antenna 16 are assembled to the cover body 12.

Figure 2:
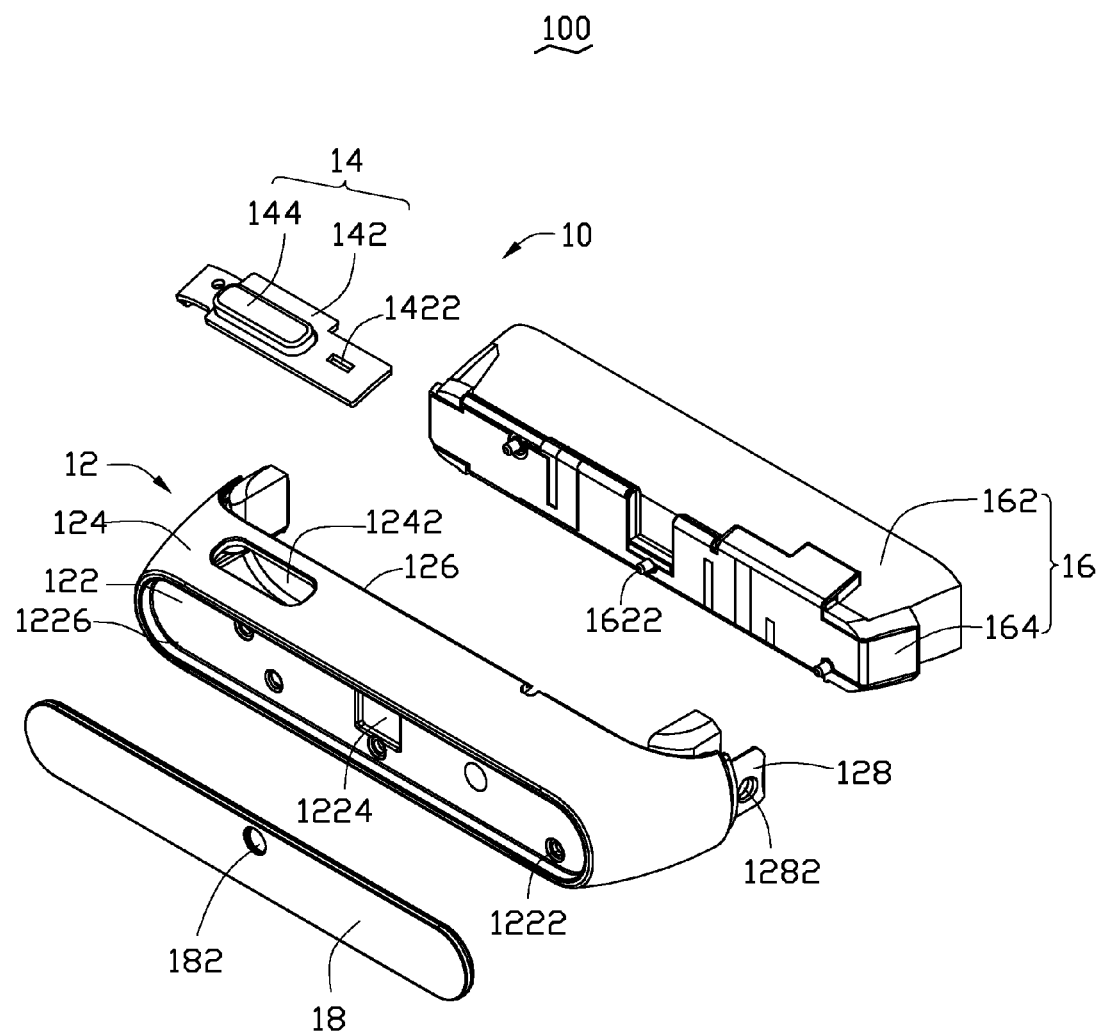
FIG. 2 is an exploded, isometric view of an exemplary embodiment of a cover assembly.
Figure 3:
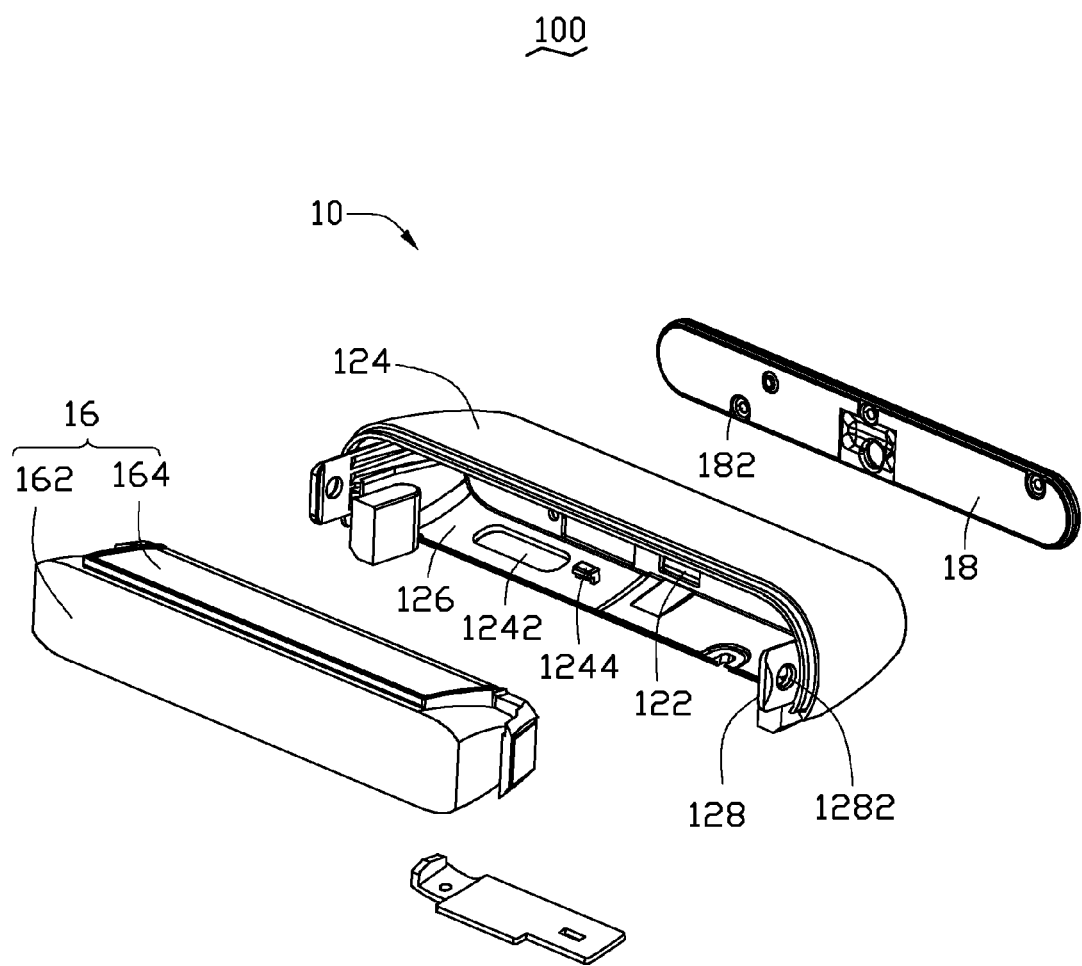
FIG. 3 is an exploded, isometric view of the cover assembly, but shown from another angle.

Referring to FIG. 2 and FIG. 3, the cover body 12 includes an end wall 122 and a peripheral wall 124. The end wall 122 and the peripheral wall 124 cooperatively define a receiving slot 126. The end wall 122 defines one or more through holes 1222 and an opening 1224. An assembly slot 1226 is defined in the end wall 122 opposite to the receiving slot 126. The decorative sheet 18 is received in the assembly slot 1226. The decorative sheet 18 defines a cable hole 182 aligning with the opening 1224. The peripheral wall 124 defines an assembly hole 1242. A latching element 1244 is positioned on an inner surface of the peripheral wall 124. Two arms 128 extend from the end wall 122 facing to each other. Each arm 128 defines a threaded hole 1282.

The function key 14 includes a latching plate 142 and a press portion 144 positioned on the latching plate 142. The latching plate 142 defines a slot 1422 passing therethrough. The latching element 1244 latches to the slot 1422 for fixing the function key 14 to the cover body 12.

The antenna 16 includes a main portion 162 and a radiator 164 covering on the main portion 162. One or more hot melting posts 1622 are positioned on the radiator 164. The hot melting posts 1622 can be inserted into corresponding through holes 1222, and the antenna 16 fixed to the cover body 12 by hot melting.

Figure 4:
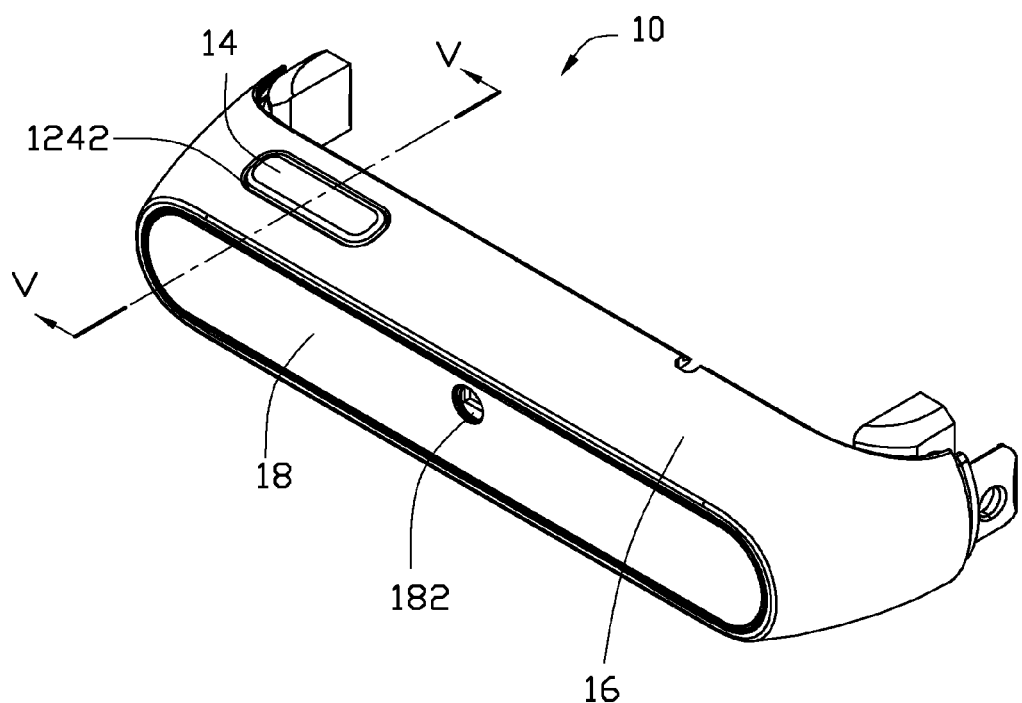
FIG. 4 is an assembled view of the cover assembly shown in FIG. 2.
Figure 5:
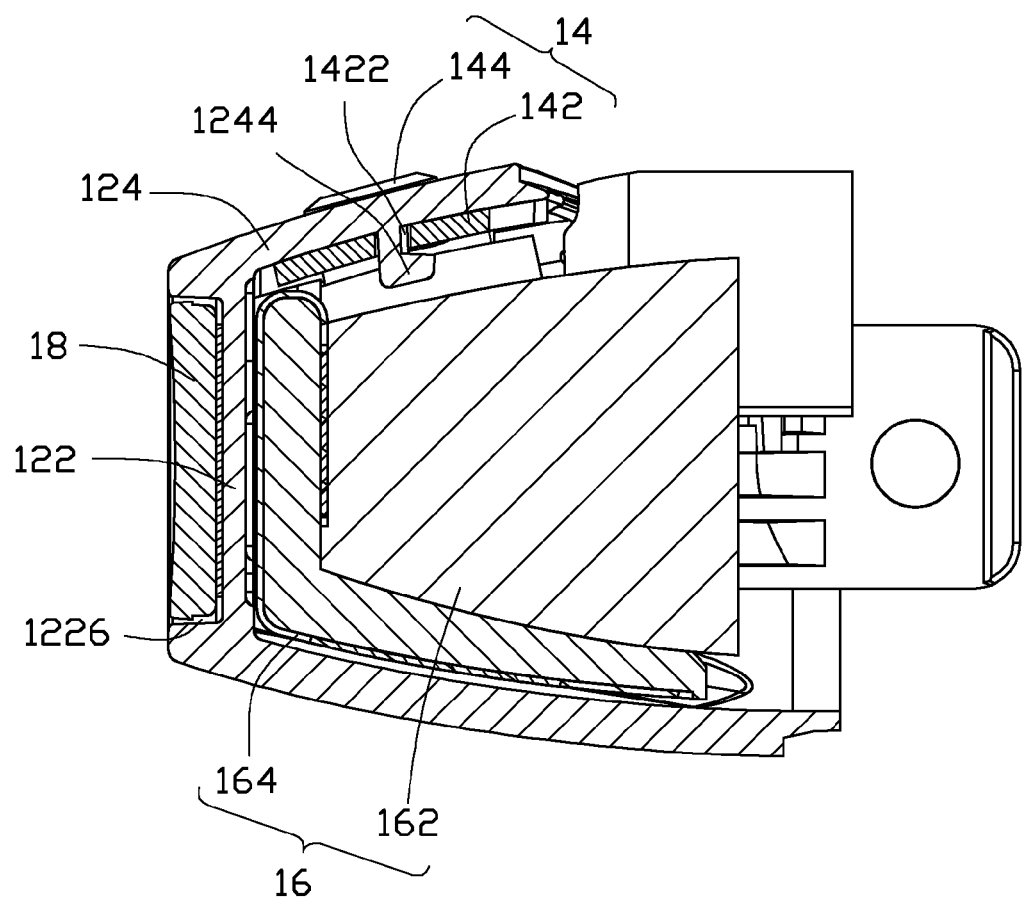
FIG. 5 is a cross-sectional view of the cover assembly shown in FIG. 4, taken along line V-V.

Referring to FIG. 4 and FIG. 5, in assembly, the function key 14 is received in the receiving slot 126, and the press portion 144 extends from the assembly hole 1242. When the latching plate 142 resists the peripheral wall 124, the latching element 1244 is latched into the slot 1422. Therefore, the function key 14 is fixed on the cover body 12. The antenna 16 is placed into the receiving slot 126 and the hot melting posts 1622 are inserted into the through holes 1222. The hot melting posts 1622 are secured to the cover body 12 after hot melting. Therefore, the antenna 16 is fixed to the cover body 12 and resists the function key 14. The function key 14 is sandwiched between the antenna 16 and the cover body 12.

The decorative sheet 18 is placed in the assembly slot 1226 and adhered to the end wall 122. Then, two bolts (not shown) are provided, the bolts are threaded into the threaded hole 1282 and connect to the main body 20. Therefore, the cover assembly 10 is assembled to the main body to form the electronic device 100. If the antenna 16 is damaged, it is convenient to detach the antenna from the main body 20.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A cover assembly, comprising:
   a cover body comprising an end wall and a peripheral wall cooperatively defining a receiving slot, the peripheral wall defining an assembly hole;
   an antenna received in the receiving slot and fixed to the end wall; and
   a function key comprising a latching plate and a press portion positioned on the latching plate; the press portion extending from the assembly hole, the latching plate sandwiched between the antenna and the cover body.

2. The cover assembly as claimed in claim 1, wherein the peripheral wall comprises a latching element positioned thereon, the latching plate defines a slot, the latching element is latched into the slot.

3. The cover assembly as claimed in claim 1, wherein the antenna comprises a hot melting post, the end wall defines a through hole, the hot melting post secured to the end wall by hot melting.

4. The cover assembly as claimed in claim 1, further comprising a decorative sheet, wherein the end wall defines an assembly slot, the decorative sheet is fixed in the assembly slot.

5. An electronic device, comprising:
   a main body;
   a cover assembly assembled to the main body; the cover assembly comprising:
      a cover body comprising an end wall and a peripheral wall cooperatively defining a receiving slot, the peripheral wall defining an assembly hole;

an antenna received in the receiving slot and fixed to the end wall; and a function key comprising a latching plate and a press portion positioned on the latching plate; the press portion extending from the assembly hole, the latching plate sandwiched between the antenna and the cover body.

6. The electronic device as claimed in claim 5, wherein two arms extend from the peripheral wall facing to each other, the arms connect to the main body.

7. The electronic device as claimed in claim 6, wherein each arm defines a threaded hole, two bolts are inserted into the threaded hole to connect the cover assembly to the main body.

8. The electronic device as claimed in claim 5, wherein the peripheral wall comprises a latching element positioned thereon, the latching plate defines a slot, the latching element is latched into the slot.

9. The electronic device as claimed in claim 5, wherein the antenna comprises a hot melting post, the end wall defines a through hole, the hot melting post secured to the end wall by hot melting.

10. The electronic device as claimed in claim 5, further comprising a decorative sheet, wherein the end wall defines an assembly slot, the decorative sheet is fixed in the assembly slot.

* * * * *